US011858786B2

(12) United States Patent
Habisohn et al.

(10) Patent No.: US 11,858,786 B2
(45) Date of Patent: Jan. 2, 2024

(54) SYSTEMS AND METHODS FOR DAMPENING TORSIONAL OSCILLATIONS OF CRANES

(71) Applicant: POWER ELECTRONICS INTERNATIONAL, INC., East Dundee, IL (US)

(72) Inventors: Michael V. Habisohn, Park Ridge, IL (US); Michael R. A. Habisohn, Park Ridge, IL (US)

(73) Assignee: Power Electronics International, Inc., East Dundee, IL (US)

( * ) Notice: Subject to any disclaimer, the term of this patent is extended or adjusted under 35 U.S.C. 154(b) by 795 days.

(21) Appl. No.: 16/934,176

(22) Filed: Jul. 21, 2020

(65) Prior Publication Data
US 2022/0024730 A1   Jan. 27, 2022

(51) Int. Cl.
*B66C 13/44* (2006.01)
*F16F 15/02* (2006.01)
(Continued)

(52) U.S. Cl.
CPC ............ *B66C 13/44* (2013.01); *F16F 15/002* (2013.01); *F16F 15/02* (2013.01); *G05B 19/042* (2013.01); *G05B 2219/2667* (2013.01)

(58) Field of Classification Search
CPC ......... B60C 13/44; F16F 15/002; F16F 15/02; G05B 19/042
(Continued)

(56) References Cited

U.S. PATENT DOCUMENTS 4,717,029 A * 1/1988 Yasunobu ............. B66C 13/063
                                                          212/270
5,219,420 A * 6/1993 Kiiski ................... B66C 13/063
                                                          212/275
(Continued)

FOREIGN PATENT DOCUMENTS

EP       2952466 A1     12/2015
JP    H05116883 A  *   5/1993   ............. B66C 13/22
(Continued)

OTHER PUBLICATIONS

JPH05116883A (Junji et al.) (May 14, 1993) (Machine Translation) (Year: 1993).*
(Continued)

*Primary Examiner* — Mahmoud Gimie
(74) *Attorney, Agent, or Firm* — MARSHALL, GERSTEIN & BORUN LLP

(57) ABSTRACT

An electronic module that dampens torsional oscillation of an object rotating in a horizontal plane in a system that includes a motor control. The electronic module includes a memory that is configured to store a mass-dependent value of the object or of rotating parts of the system, a housing, and a processor that is positioned within the housing. The processor is configured to receive a mass-dependent value of the object, store the mass-dependent value of the object in the memory, calculate a torsional oscillation dampening signal using an algorithm that is based at least in part on the mass-dependent value of the object or of the rotating parts of the system, and transmit the torsional oscillation dampening signal to the motor control thereby dampening torsional oscillation of the object rotating in the horizontal plane.

35 Claims, 9 Drawing Sheets

(51) Int. Cl.
*G05B 19/042* (2006.01)
*F16F 15/00* (2006.01)

(58) Field of Classification Search
USPC .......................................................... 700/213
See application file for complete search history.

(56) References Cited

U.S. PATENT DOCUMENTS

| | | |
|---|---|---|
| 5,490,601 A | 2/1996 | Heissat et al. |
| 5,960,969 A | 10/1999 | Habisohn |
| 6,050,429 A | 4/2000 | Habisohn |

FOREIGN PATENT DOCUMENTS

| | | | | |
|---|---|---|---|---|
| WO | WO-9739812 A2 * | 10/1997 | ........... | B66C 13/063 |
| WO | WO-0232804 A2 * | 4/2002 | ........... | B66C 13/063 |
| WO | WO-2013/041770 A1 | 3/2013 | | |

OTHER PUBLICATIONS

European Patent Application No. 21182525.2, Extended European Search Report, dated Jan. 7, 2022.

* cited by examiner

SYSTEMS AND METHODS FOR DAMPENING TORSIONAL OSCILLATIONS OF CRANES

FIELD OF TECHNOLOGY

The present disclosure generally relates to control systems of cranes and, in particular, control systems for dampening torsional oscillations of crane loads and/or underhook attachments that are suspended by a twistable connection such as a rope, chain, cable, or wire, etc.

DESCRIPTION OF THE RELATED ART

Cranes (e.g., suspension cranes, EOT electric overhead traveling cranes, gantry cranes, building cranes, circular polar cranes, monorail, jib, cranes used in ports, crawler cranes etc.) are used to support and transport objects in and around, for example, a warehouse, a shipping yard, a construction site, etc. Typically, the crane includes, among other components, a carriage that traverses a track and a rope hoist that descends from the carriage and includes an attachment mechanism that couples the object to be transported to the rope hoist. The track along which the carriage traverses is typically linear. When an object is moved from a first position on the track to a second position on the track, momentum typically causes the object to swing during travel and after the desired movement is completed, resulting in pendulum motion of rope and all attached components, that, left unchecked, typically takes a long time to fade. This phenomena occurs in the vertical plane that is parallel to the direction of motion of the motorized component of the crane, and if the system has 2 degrees of freedom, as in the case of a trolley & bridge, the resulting motion of the rope and load will be a combination of the swinging caused by the individual motions in each axes.

The pendulum effect brings two problems. First, the long time that it takes for pendulum motion to fade on its own delays business operations. Second, the swinging object can cause collisions that harm the object itself or nearby individuals or structures. Typically, the suspended object is heavy or long (too heavy or long for a person to carry), so collisions can be dangerous or cause serious harm.

In industrial operations, the effect is difficult or impossible to resolve manually. To solve that problem, electronic modules have been developed that abated the motion automatically. The modules send a signal to the motor controllers or drives that cause the crane to be moved in a way that effectively counteracts the pendulum motion that would otherwise occur, or, control systems have been implemented into the motor controllers or drives that would allow for the elimination of the pendulum effect. An example of a system that uses such a control technique for dampening the oscillations of the object in this way can be found in U.S. Pat. No. 5,960,969, titled "Method for Dampening Load Oscillations on a Crane."

That kind of system addresses some of the most important and prevalent oscillation issues faced by industry. But systems such as those are not designed to and do not effectively address a different oscillation problem. Aside from moving objects linearly, cranes are also often used to rotate the suspended object. In one application, a motorized rotating hook block enables the rotation of a load. The rotating hook block is suspended by a twistable mechanism from the hoist, while the load is suspended from the rotating hook block either by more twistable means or by being rigidly coupled to the rotating mechanism of the rotating hook block. When the suspended object is rotated the forces due to acceleration act against the inertia of the load and rotating hook block subsystem and causes them to wind up on the means of suspension. This subsystem continues to wind up until the combination of the torsional dynamics of the system and acceleration of the motorized means gives way to motion in the desired direction. This twisting behavior, however, introduces one or more oscillatory components to both the rotating hook block as well as the load. The subsystem will continue to oscillate during the steady rotation of the motorized means as well as after deceleration of the device. As described, this is a fundamentally different kind of oscillation, in that it is about a vertical axis and in the horizontal plane. As such, controllers designed to resolve pendulum motion simply do not adequately address this issue.

To keep industrial operations moving, operators sometimes resort to trying to stop these kinds of rotational oscillations manually. That is often dangerous, and operators are often forced to simply allow the object to come to rest on its own, causing significant operational delays. Additionally, fine rotational positioning of these loads is often extremely difficult due to the severe oscillatory behavior of the suspended systems.

SUMMARY

The problem has been solved after recognizing that, unlike the period of oscillation in pendulum motion, the period of oscillation in rotational oscillation is dependent on the mass of the suspended system.

The system and method for dampening torsional oscillation described here advantageously mitigates or substantially eliminates torsional oscillation experienced by an object suspended from a crane. In particular, the system receives a control command (e.g., a speed command, a position command, a rotate command, etc.) from a controller communicatively coupled to the system. The system then calculates a torsional oscillation dampening signal. Unlike previously known systems used to control pendulum motion, the new device uses an algorithm that is dependent at least in part on a mass-dependent value of the object. Once the torsional oscillation dampening signal is calculated, the modified signal is transmitted to a motor controller, or drive, which then operates a motor using the calculated torsional oscillation dampening signal in a way that reduces or effectively eliminates torsional oscillation of the object that would have otherwise been introduced by a non-modified control signal.

One embodiment of the new development is an electronic module that dampens torsional oscillation of an object that rotates in a horizontal plane in a system that includes a motor control. The electronic module includes a housing, a processor that is positioned within the housing, and a memory that is configured to store a mass-dependent value of the object. The processor may be configured to receive the mass-dependent value of the object, store the mass-dependent value of the object in the memory, calculate a torsional oscillation dampening signal using an algorithm that is based at least in part on the mass-dependent value of the object, and transmit the torsional oscillation dampening signal to the motor control. In use, that signal dampens torsional oscillation of the object.

A second embodiment of the new development is a system that dampens torsional oscillation of an object that rotates in a horizontal plane. The system includes a motor that is configured to rotate the object in the horizontal plane, a motor control that is operably coupled to the motor and is configured to control the motor based on at least one input, and an electronic module that is communicatively coupled to the motor control. The electronic module includes a housing, a memory that is disposed within the housing and is configured to store a mass-dependent value of the object, and a processor that is disposed within the housing and is configured to store information on and receive information from the memory. The processor is configured to receive the mass-dependent value of the object or of rotating parts of the system in the horizontal plane, store the mass-dependent value of the object or of the rotating parts of the system in the memory, calculate a torsional oscillation dampening signal using an algorithm that is based at least in part on the mass-dependent value of the object, and transmit the torsional oscillation dampening signal to the motor control causing the motor control to operate the motor based on the torsional oscillation dampening signal. In use, that signal dampens torsional oscillation of the object.

A third embodiment of the new development is another system that dampens torsional oscillation of an object that rotates in a horizontal plane. The system includes a securement mechanism that is configured to suspend the object in the horizontal plane, a motor that is operably coupled to the securement mechanism and is configured to manipulate the securement mechanism so it rotates the object in the horizontal plane, and an electronic module that is communicatively coupled to the controller. The electronic module includes a motor control that is operably coupled to the motor and is configured to operate the motor based on at least one input, a memory that is disposed within the housing and is configured to store a mass-dependent value of the object, and a processor that is disposed within the housing and is configured to store information on and receive information from the memory. The processor is configured to receive the mass-dependent value of the object, store the mass-dependent value of the object in the memory, calculate a torsional oscillation dampening signal using an algorithm that is based at least in part on the mass-dependent value of the object, and transmit the torsional oscillation dampening signal to the motor control. In use, that signal dampens torsional oscillation of the object.

A fourth embodiment of the new development is a method for dampening torsional oscillation of an object that rotates on a horizontal place in a system that includes a motor control. The method includes providing a memory having a memory capacity, a portion of the memory capacity including a mass-dependent value of the object or of rotating parts of the system and an algorithm that calculates a torsional oscillation dampening signal using the mass-dependent value, and a processor that is configured to store and retrieve the mass-dependent value from the memory. In the method, the processor receives a command signal from an input/output (IO) device. In response to receiving the command signal from the IO device, the processor retrieves the mass-dependent value and the algorithm from the memory. The processor calculates the torsional oscillation dampening signal as a function that is based at least in part on the stored mass-dependent value using the algorithm. The processor transmits the calculated torsional oscillation dampening signal to the motor control. The motor control operates the motor based at least in part on the calculated torsional oscillation dampening signal, thereby dampening torsional oscillation of the object or of the rotating parts of the system in the horizontal plane.

The values of different mass-dependent characteristics can be used in the first, second, third, and/or fourth embodiments identified above.

In one form, the mass-dependent value is a measured weight of the object or of the system.

In another form, the mass-dependent value is a measured period of oscillation of the object or of the system when rotating in the horizontal plane without dampening. In yet another form, the mass-dependent value is a measured or referenced moment of inertia of the object or of the system.

Similarly, the memory can have different characteristics in the first, second, third, and/or fourth embodiments.

In one form, the memory stores at least one predetermined angular result. The at least one predetermined angular position indicates either (a) a predetermined angular displacement or (b) a predetermined angular position. The processor is also configured to receive the predetermined angular position and to calculate the torsional oscillation dampening signal using the predetermined angular position in the algorithm In another form, the memory stores at least one predetermined angular velocity. The processor is configured to determine the torsional oscillation dampening signal using the algorithm based further in part on the at least one predetermined angular velocity and the command signal.

In one another form, the memory stores at least one predetermined angular result that indicates either (a) a predetermined angular displacement or (b) a predetermined angular position, and the processor is configured to receive a command signal from an input/output (IO) device. In this form, the processor is configured to use either the command signal or the predetermined angular result in the algorithm to determine the torsional oscillation dampening signal.

Similarly, the system itself can take different forms in the various embodiments.

In one form, the module is configured for use with objects that are suspended by a rope, a chain, a cable, or a wire.

In another form, the object includes a load and a motor that is controlled by the motor control and is used to rotate the load.

In another form, the object is suspended by a rope, a chain, a cable, or a wire that depends from a motor that is controlled by the motor control.

In another form, the housing includes a securement mechanism that includes a first attachment mechanism and a second attachment mechanism. The first attachment mechanism is configured to couple the securement mechanism to the rope, the chain, the cable, or the wire. The second attachment mechanism is configured to couple the object to the rope and allows for rotation of the object by a motor operably coupled to the second attachment mechanism.

In another form, the processor is configured to receive a command signal from an input/output (IO) device.

In another form, the processor is configured to receive a sensor signal from a sensor, with the processor being configured to determine the torsional oscillation dampening signal using (at least in part) the sensor signal in the algorithm.

In another form, the command signal again includes at least one predetermined angular result that indicates either (a) a predetermined angular displacement or (b) a predetermined angular position. The processor is configured to use (at least in part) the command signal in the algorithm to determine the torsional oscillation dampening signal.

In yet another form, the command signal includes at least one predetermined angular velocity, and the processor is configured to determine the torsional oscillation dampening signal using (a least in part) the command signal in the algorithm.

In another form, the system further includes an input/output ("IO") device that is communicatively coupled to the electronic module. The IO device is configured to receive a command input from a user and transmit a command signal to the electric module.

In another form, the system further includes an input/output (IO) device that is communicatively coupled to the electronic module. The IO device including a plurality of buttons configured to transmit a command signal to the electronic module in response to a user interacting with the plurality of buttons. first button of the plurality of buttons is configured to transmit a first command signal to the electronic module each time the first button is pressed. The first command signal includes a first angular displacement. The processor of the electronic module is configured to calculate a first total angular displacement based on the number of first command signals received from the IO device and to determine the torsional oscillation dampening signal based on the calculated first total angular displacement.

In another form, the IO device includes a second button of the plurality of buttons that is configured to transmit a second command signal to the electronic module each time the second button is pressed. The second command signal includes a second angular displacement that is an additive inverse of the first angular displacement. The processor of the electronic module is configured to calculate a second total angular displacement based on a number of first command signals received from the IO device and a number of the second command signals received from the IO device, and to determine the torsional oscillation dampening signal based on the calculated second total angular displacement.

In another form, the IO device includes a switch movable between a first position and a second position. When the switch is in the first position, the first command signal includes a first angular displacement, and when the switch is in the second position, the first command signal includes a second angular displacement, the first angular displacement being different than the second angular displacement.

In another form, the IO device includes a potentiometer configured to receive the at least one command input. The at least one command input is indicative of a predetermined angular position, and the command signal is indicative of the predetermined angular position. The processor is configured to determine the torsional oscillation dampening signal based in part on the received command signal.

DETAILED DESCRIPTION

Figure 1:
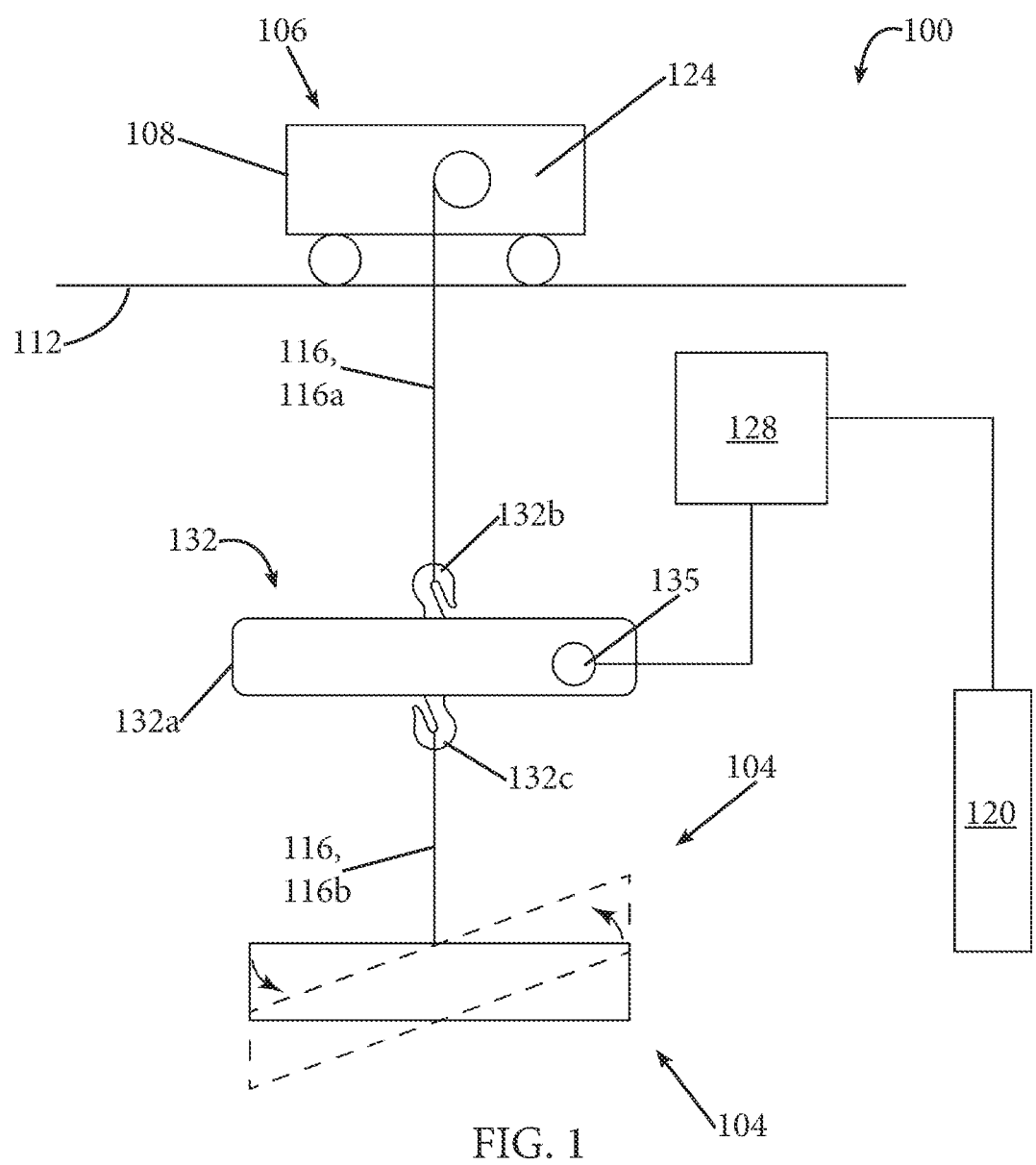
FIG. 1 is a block diagram of a system for dampening torsional oscillation of an object that rotates in the horizontal plane.
Figure 3:
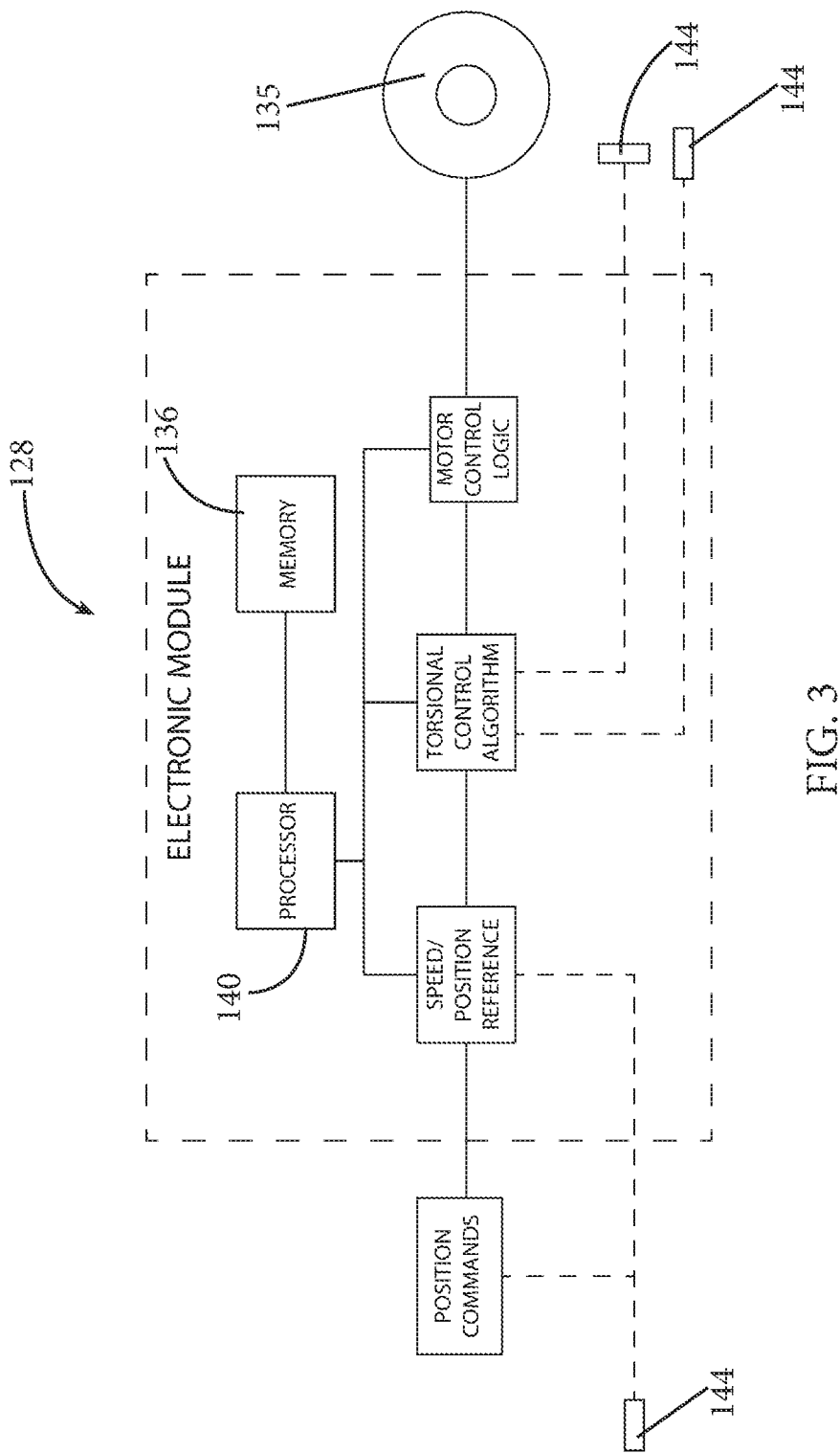
FIG. 3 is a block diagram of the electronic module of FIG. 1 and FIG. 2 receiving a positional command.
Figure 4:
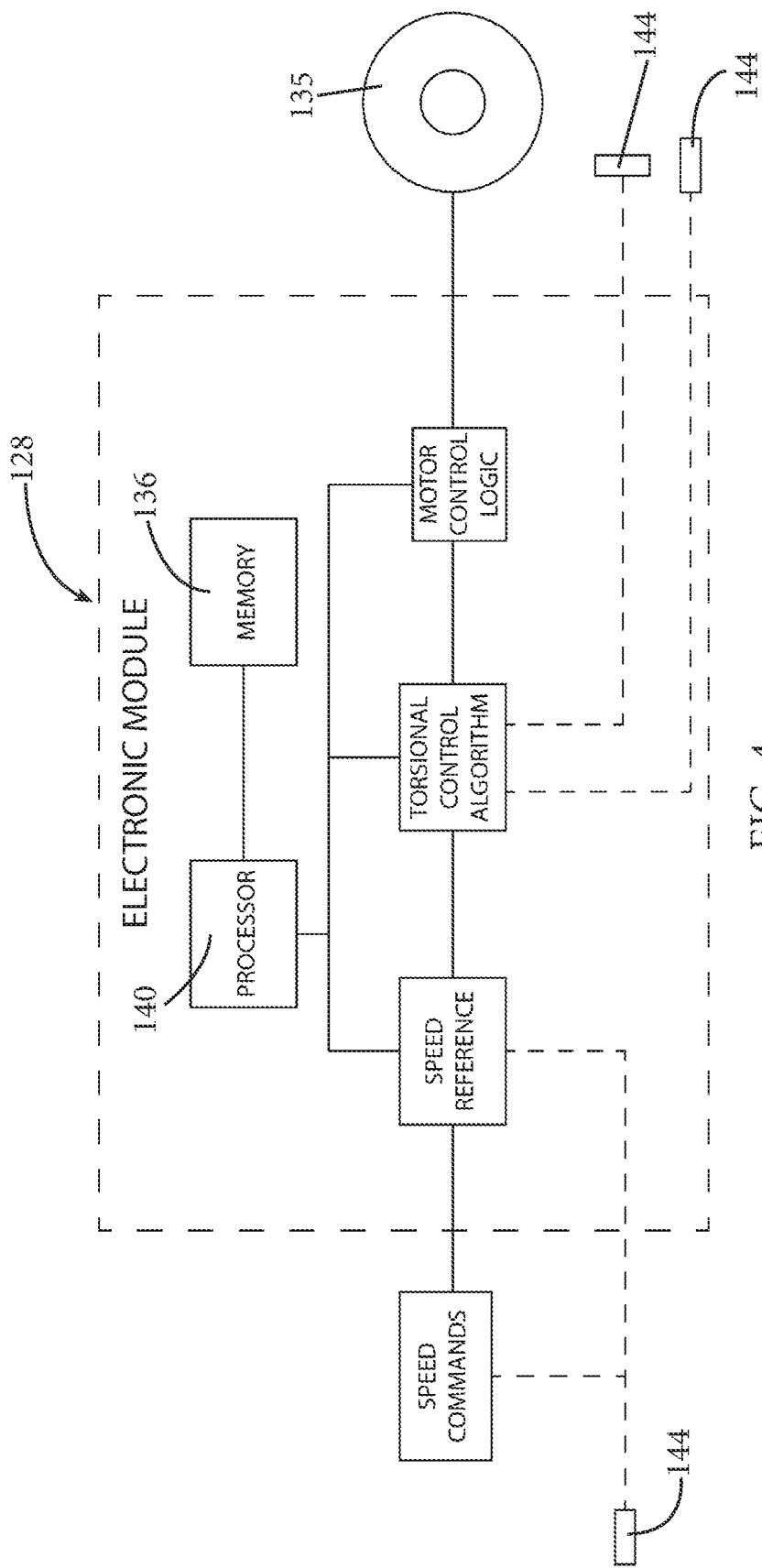
FIG. 4 is a block diagram of the electronic module of FIG. 1 and FIG. 2 receiving a speed command.

FIGS. 1, 3, and 4 illustrate a first embodiment of a system 100 for dampening torsional oscillation of a suspended object 104, or of parts of the system 100, that rotates in the horizontal plane. The system 100 includes an overhead crane 106 that rotates the object 104, an electronic module 128 that receives command signals from an input/output ("IO") device 120, and a securement mechanism 132 that operably couples the object 104 to the overhead crane 106. Receipt of the command signal(s) by the electronic module 128 triggers a series of processes that are executed by a processor 140 of the electronic module 128 to mitigate, if not effectively eliminate, torsional oscillation of the object 104. In particular, the processor 140 of the electronic module 128 calculates, in response to receiving the command signal(s) from the IO device 120, a torsional oscillation dampening signal using an algorithm that is based at least in part on a mass-dependent value of the object. The processor 140 applies the calculated torsional oscillation dampening signal to a set of motor control logic, which, when executed, dampens the torsional oscillation of the object 104 rotating in the horizontal plane. Importantly, as discussed throughout the application, the electronic module 128 (or motor control 238) operates a motor in a way that causes the suspended object to rotate in a way that effectively counteracts the torsional oscillation. Accordingly, the electronic module 128 of FIG. 1 is a self-contained module that directly controls the operation of the securement mechanism 132 in a manner that mitigates, if not effectively eliminates, torsional oscillations experienced by the object 104 as the object 104 rotates in the horizontal plane. As used throughout the disclosure, mitigation, or elimination, of torsional oscillation means torsional oscillation that would have otherwise been introduced by a non-modified control signal when executed.

As used throughout this disclosure, the term "mass" or "mass of the object" means the mass of a load, the mass of a load and a securement mechanism, the mass of a load, a securement mechanism, and a rotational motor, or mass of a load, a securement mechanism, a rotational motor, and portions of the cable.

The system 100 may be used in facilities where objects 104 transported throughout the facility, or outdoor area, are too heavy, too large, or oddly shaped for facility workers to manually transport. For example, the system 100 can be used in manufacturing facilities, assembly lines, warehouses, storage units, refineries, foundries, nuclear plants, coal and natural gas run power plants, construction sites, and any other facilities that receive and store large objects that require mechanical means for transporting the objects within the facility. Further, while the electronic module 128 of FIG. 1 is shown in use with an overhead crane, the disclosed electronic module 128 can also be used with, for example, other types of cranes, such as a bridge crane, a circular crane, a crane used in a nuclear facility, a double-girder bridge crane, a single-girder bridge crane, a gantry crane, or a jib crane. Further, the scope of the disclosure is not limited to cranes used in facilities. For example, the system 100 can instead be used with a deck crane, a crawler crane, a floating crane, a gantry crane, a rough terrain crane, a truck-mounted crane, a bridge crane, polar crane, a bulk-handling crane, a hammerhead crane, a stacker crane, a telescopic crane, a portal crane, or a tower crane.

The overhead crane 106 of FIG. 1 includes a trolley 108 and a hoist motor 124 that raises and lowers the suspended object 104. In general, the hoist motor 124 can be any motor that has sufficient power to raise and lower the suspended object 104. For example, the hoist motor 124 can be an induction motor, a servo motor, a stepping motor, a torque motor, a switched reluctance motor, a brush-less DC motor, a DC motor, a synchronous motor, or an asynchronous motor.

Figure 2:
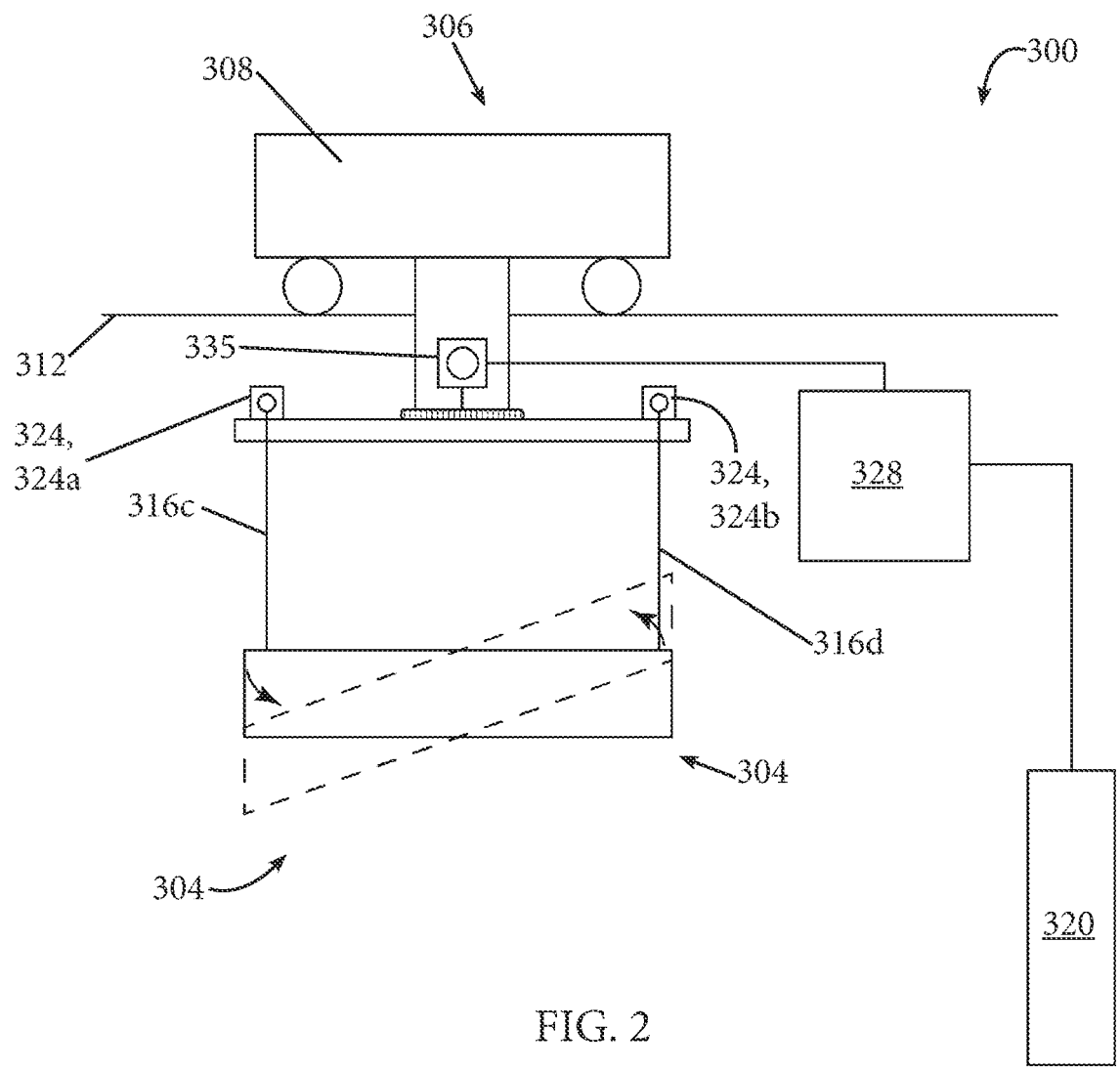
FIG. 2 is a block diagram of another system for dampening torsional oscillation of an object that rotates in the horizontal plane.

The illustrated object 104 handled by the overhead crane 106 is suspended from the hoist motor 124 of the trolley 108 by a rope 116 and the securement mechanism 132. As used throughout the disclosure, the word "object" means an object suspended from the overhead crane, an object suspended from a rope, a load suspended from the overhead crane, a load suspended from a rope, an object or a load and a securement mechanism, an object or a load, a securement mechanism, and a rotational motor. The illustrated securement mechanism 132 houses a rotational motor 135 that is used to rotate the object 104. There are no special requirements for the rotational motor that would not be understood by those of ordinary skill in the art. Any conventional motor known for use in these settings, such as, for example, an induction motor, a servo motor, a stepping motor, a torque motor, a switched reluctance motor, a brushless DC motor, a conventional DC motor, a synchronous, or an asynchronous motor, can be used. Benefits of the invention can be achieved without mounting the rotational motor 135 in the securement mechanism 132. For example, the rotational motor 135 can be positioned at the top of the rope 116, as part of or connected to the overhead crane 108, as seen in FIG. 2.

A first portion of the rope 116a is operably coupled to the hoist motor 124 of the trolley 108 and extends from the hoist motor 124 of the trolley 108 to the securement mechanism 132. There are no special requirements for the composition of the rope 116. While a fibrous rope is illustrated in FIGS. 1 and 2, metal chains, composite cables, or wires can also be used, and the word "rope" is intended to cover all such arrangements known in the art. A second portion of the rope 116b extends from the securement mechanism 132 to the object 104 that is being hoisted by the hoist motor 124 of the trolley 108, enabling the rotational motor 135 to be used to rotate the suspended object 104 in the horizontal plane. Positioning the securement mechanism toward the bottom of the rope 116 can make connecting and disconnecting the object 104 easier.

There are no special requirements for the composition of the securement mechanism 132 that would not be understood by those of ordinary skill in the art. For example, any conventional securement mechanism currently known for use in rotating loads or coupling loads to a hoist motor, can be incorporated into a system that benefits from the new development. As illustrated in FIG. 1, the securement mechanism 132 includes a housing 132a, a first attachment mechanism 132b, and a second attachment mechanism 132c. The illustrated housing 132a of the securement mechanism 132 is elongate.

The first attachment mechanism 132b enables the first portion of the rope 116a to be operably coupled to the hoist motor 124 of the trolley 108 and the second attachment mechanism 132c enables the second portion of the rope 116b to be connected to the object 104. As illustrated in FIG. 1, the first attachment mechanism 132b of the securement mechanism 132 is a hook that receives the bottom of the first portion of the rope 116a. The first attachment mechanism can be either a releasable structure or a permanent structure.

The second attachment mechanism 132c of the securement mechanism 132 is a hook that receives either a portion of the object 104 or a rope, chain, or cable that is wrapped around the object 104 that is being moved. Other arrangements can be used.

The electronic module 128 illustrated in FIG. 1 calculates the torsional oscillation dampening signal, adjusts the received control signal using the calculated torsional oscillation dampening signal, and executes the adjusted control signals, which causes the rotational motor 135 to operate and turn the object 104. So configured, the electronic module 128 also functions as a motor control. As used throughout the disclosure, the term "motor control" means contactors, switches, relays, drives, motor controllers, or any control mechanism that is capable of operating the motor. Further, as will be discussed in more detail later, the electronic module 128 is specially programmed and conventional electronic modules, such as those used to control pendulum motion, will not provide the benefits of the new development.

FIG. 2, on the other hand, illustrates a second embodiment of a system 300 for dampening torsional oscillation of a suspended object 304, or of parts of the system 300, that rotates in the horizontal plane. Similar to the system 100 of FIG. 1, the system 300 of FIG. 2 includes the overhead crane 306 having a trolley 308 that is disposed on and travels along the track 312, a securement mechanism 332, and the suspended object 304 that is coupled to the securement mechanism 332. It also includes the IO device 320 that receives an input from an operator and transmits a command signal to the electronic module 328 in response to that input. While FIG. 2 illustrates the system 300 as including the trolley 308, the securement mechanism 332 may instead be coupled to an I-beam that is secured to a ceiling of a facility. As used throughout the disclosure, the term "transmit" or "transmits" means transmitting from a first physical component to a second physical component, from a first electronic component to a second electronic component, and from one portion of an electronic component to another portion of the same electronic component (e.g., from one portion of a processor to another portion of a processor).

The system 300 illustrated in FIG. 2 includes many of the same or similar components as the system 100 illustrated in FIG. 1. The system 300, however, includes a modified configuration and integration of the securement mechanism 332. Rather than being coupled to the hoist motors 324 disposed on or within the trolley 308, the securement mechanism 332 is operably coupled to the trolley 308 and has a plurality of hoist motors 324 disposed on the securement mechanism 332. In particular, the securement mechanism 332 includes a vertical portion 332e that is coupled to the trolley 308 and a horizontal portion 332f that is rotatably coupled to the vertical portion 332e. Disposed within the vertical portion 332e of the securement mechanism 332 is a rotational motor 335 that is operably coupled to a set of gears (not shown). The rotational motor 335, along with the set of gears, rotate the horizontal portion 332f, which ultimately rotates the object 304. In other words, the rotational motor 335 rotates the horizontal portion 332f relative to the vertical portion 332e. However, in other examples, the rotational motor 335 and securement mechanism 332 can be configured such that the securement mechanism 335 (i.e., the vertical portion 332e and the horizontal portion 332f) rotates relative to the trolley 308.

The horizontal portion 332f is elongate and the plurality of hoist motors 324 are disposed on either end of the horizontal portion 332f. The plurality of hoist motors 324 are operably coupled to the object 304. In particular, a first hoist motor 324a of the plurality of hoist motors 324 is operably coupled to the object 304 via a first rope 316c and a second hoist motor 324b of the plurality of hoist motors 324 is operably coupled to the object 304 via a second rope 316d.

As shown in FIGS. 3 and 4, the electronic module 128, 328 includes a memory 136 and a processor 140 that is configured to store and retrieve information from the memory 136. The memory 136 must be configured to store various parameters. In general, any conventional processor and memory can be adapted to the invention, but to provide the benefits of the invention one of the parameters must be configured to store and recognize a mass-dependent value for use in calculating the torsional oscillation dampening signal. For example, the parameters can include the weight of the object 104, 304 itself, or the portions of the system that rotate in the horizontal plane, its period of oscillation when rotating in the horizontal plane, or the moment of inertia of the object itself or the portions of the system that rotate in the horizontal plane.

The parameters may be manually input by a user through the IO device 120, 320 or preprogrammed onto the memory 136. In either situation (e.g., manual entry or preprogramming) the parameters may be modified by the user, for example, using the IO device 120, 320. Further, the memory 136 has a memory capacity large enough to include a dedicated portion of the memory capacity on which the various parameters are stored. As will be explained in further detail later, when the electronic module 128, 328 receives a command signal from the IO device 120, 320, the processor 140, in processing the command signal, accesses the particular parameter stored on the memory 136 necessary to calculate the torsional oscillation dampening signal. Which parameter the processor 140 retrieves from the memory 136 depends on the command signal received by the electronic module 128, 328. Having a dedicated portion of the memory capacity for the various parameters ensures the processor 140 may access and retrieve the necessary parameters to modify received command signals in a way that mitigates, or substantially eliminates, torsional oscillation experienced by the object 104 or the system 100.

The illustrated IO device 120, 320 is a user interface through which an operator provides commands to the overhead crane 106, 306. The IO device 120, 320 is communicatively coupled to the electronic module 128, 328 and configured to transmit at least one command signal to the electronic module 128, 328. In particular, the IO device 120, 320 is a pendant that is communicatively coupled to the electronic module 128, 328 via a cable capable of transmitting signals. Alternatively, in other embodiments, the IO device 120, 320 can be communicatively coupled to the electronic module 128, 328 via Bluetooth or Wi-Fi. The illustrated IO device 120, 320 has different buttons each of which corresponds to a unique command signal. For example, as will be discussed further, one button can be used to rotate the object in a first manner, a second button can be used to rotate the object in a second manner different from the first manner, and a third button can be used to rotate the object in a third manner that is different from both the first and second manners. In any event, the IO device 120, 320 is configured to associate the first, second, and third buttons with unique command signals. Each unique command signal is transmitted from the IO device 120, 320 to the electronic module 128, 328, which causes the electronic module 128, 328 to rotate the object 104, 304 in the first, second, or third manner depending on which button the operator pressed.

With all this information stored on the memory 136, as discussed above, using an IO device 120, 320 that lacks a display (such as the pendant) may be inefficient, or frustrating, because the operator may unknowingly select the incorrect mass-dependent value repeatedly. It is therefore desirable to have an IO device 120, 320 that verifies, or provides confirmation that, the correct mass-dependent value was selected without use of the display. For example, the IO device 120, 320 can include an intelligent virtual assistant ("IVA") or an intelligent personal assistant ("IPA") capable of receiving voice commands and communicating with the operator. In such an example, the IO device 120, 320 can include a plurality of microphones and a plurality of speakers. In particular, the IO device 120, 320 may use the plurality of microphones to detect, listen, and record a voice command from the operator. Once the IO device 120, 320 analyzes the voice command and executes the task associated with the particular voice command, the IVA, IPA, or other artificial intelligence ("AI"), can speak to the operator using the speakers and indicate which mass-dependent value was selected from the memory 136 or the remote database. The IO device 120, 320 may still receive inputs from the operator as discussed above, but, in addition, the IVA, IPA, or other AI, may audibly notify the user which mass-dependent value was selected.

In the disclosed system 100, 300 there are no special requirements for the IO device 120, 320 that would not be understood by those of ordinary skill in the art. Any conventional IO device 120, 320 that is known for use in these settings can be incorporated into a system benefitting from the new development. While the IO device 120, 320 has been described and illustrated in FIGS. 1 and 2 as being a pendant, the IO device 120, 320 may be another device capable of receiving an input from the user and transmitting the received input in the form of the command signal to the electronic module 128, 328. For example, the IO device 120, 320 can be a smart phone, a smart tablet, a phablet, a laptop, a desktop, cabin controls disposed within a cabin of an overhead crane, or a radio control.

While FIGS. 1 and 2 illustrate the IO device 120, 320 and the electronic module 128, 328 as distinct components, it is possible to combine the IO device 120, 320 and the electronic module 128, 328 into a single structural element that combines the structure and functions of both. Again, such an arrangement is consistent with, and not a departure from, the teachings of this disclosure.

FIGS. 3 and 4 are block diagrams of the electronic module 128, 328 of FIGS. 1 and 2 receiving positional commands (FIG. 3) and speed commands (FIG. 4), respectively. While FIGS. 3 and 4 illustrate the electronic module 128, 328 of FIGS. 1 and 2 in separate diagrams, the electronic module 128, 328 of FIGS. 1 and 2 is capable of receiving both positional commands and speed commands, which the electronic module 128, 328 then interprets and uses to determine a torsional oscillation dampening signal. Importantly, in the embodiments of FIGS. 1-4, the position and speed commands are received by the electronic module 128, 328, which also calculates the torsional oscillation dampening signal and uses the calculated torsional oscillation dampening signal to directly control the rotation of the object 104, 304 via the rotational motor 135, 335.

As discussed above, the mass-dependent value of the object 104, 304 (or of the rotating parts of the system) can be a period of oscillation of the object 104, 304, a period of oscillation of the rotating parts of the system, a weight of the object 104, 304, a weight of the rotating parts of the system, a moment of inertia of the object 104, 304, or a moment of inertia of rotating parts of the system. Once the electronic module 128, 328 determines the torsional oscillation dampening signal using the algorithm that is based at least in part on the mass-dependent value of the object 104, 304 or the rotating parts of the system 100, 300, the electronic module 128, 328 operates the overhead crane 106, 306 using the torsional oscillation dampening signal.

Advantageously, operating the overhead crane 106, 306 using the torsional oscillation dampening signal substantially mitigates, or eliminates, any torsional oscillation experienced by the object 104, 304 when the rotational motor 135, 335 rotates the object 104, 304.

In particular, the memory 136 may include a weight of the object 104, 304 and a weight of the rotating parts of the system 100, 300. The weight of the object 104, 304 may be measured prior to the object 104, 304 being attached to the securement mechanism 132, 332 and manually entered into the IO device 120, 320, which then transmits the weight to the electronic module 128, 328 where it is stored on the memory 136. The weight of the object 104, 304 and/or the rotting parts of the system 100, 300 can also be measured by a sensor 144 (or more than one sensor) and transmitted directly to the electronic module 128, 328 from the sensor 144. In other examples, the sensor 144 can transmit the measured weight to the IO device 120, 320, which transmits the measured weight to the electronic module 128, 328. The sensor 144 can also display the measured weight on a user interface which is read by the user and entered into the IO device 120, 320, which transmits the measured weight to the electronic module 128, 328.

The weight of the object 104, 304 and/or the weight of the rotating parts of the system can also be retrieved from a remote database (e.g., a server or the cloud). In such an example, the electronic module 128, 328 can include a (wired or wireless) communication module that communicatively couples the electronic module 128, 328 to the remote database. Once the electronic module 128, 328 is communicatively coupled to the remote database, the user may select the particular object stored on the remote database by indicating to the electronic module 128, 328 via the IO device 120, 320 a unique designation stored in the remote database that corresponds to the object 104, 304 or system 100, 300.

Overhead cranes are sometime used to rotate the same (or substantially the same) objects repeatedly. It is also common for a crane to be used to rotate several different objects in the facility, each having a different weight or moment of inertia. It is therefore desirable that the user have a quick and efficient way to select, or otherwise indicate to the electronic module 128, 328, which object is suspended from the overhead crane 108, 308. Accordingly, the weights of several different objects or elements can be stored on the memory 136, or the remote database, thereby allowing the user of the overhead crane 106, 306 to efficiently switch between objects that need to be rotated. Each object may be given a unique identifier when stored in the memory 136, or the remote database. The unique identifier may be specific to a naming convention used at the particular facility, but, in other examples, the unique identifier can be auto assigned by the electronic module 128, 328 when the overhead crane 106, 306 first picks up the object 104, 304. Additionally, the user may select the object 104, 304 from the memory 136, or remote database, using the IO device 120, 320.

The memory 136 can also store a length of the rope 116, 316c, 316d, or a function of that length, such as a suspended height of the object. In particular, the length of the rope 116, 316c, 316d (or its function) may be measured by the user either prior to attaching the object 104, 304 to the securement mechanism 132, 332 or after the object 104, 304 is suspended. In either case, the user may manually enter the measured length or function into the IO device 120, 320, which then transmits the measured length of the rope 116, 316c, 316d or its function to the electronic module 128, 328 and is subsequently stored on the memory 136. The length of the rope 116, 316c, 316d or its function may also be measured by a sensor 144 (or multiple sensors) and transmitted directed to the electronic module 128, 328 from the sensor. In other examples, the sensor 144 can transmit the measured length to the IO device 120, 320, which transmits the measured length to the electronic module 128, 328. The sensor 144 may also display the measured length on the user interface which is read by the user and entered into the IO device 120, 320, which transmits the measured length to the electronic module 128, 328. The length of the rope 116, 316c, 316d or its function can also be retrieved from the remote database. In such an example, the (wired or wireless) communication module communicatively couples the electronic module 128, 328 to the remote database after which the user may select the particular length of rope 116, 316c, 316d stored on the remote database by indicating to the electronic module 128, 328 via the IO device 120, 320 a unique designation stored in the remote database that corresponds to the length of the rope 116, 316c, 316d. This rope length can be used in conjunction with the weight dependent value to improve the calculation of the torsional oscillation dampening signal.

The memory 136 may also store a period of oscillation of the object 104, 304 as it rotates in the system. For example, the memory 136 can store the time required for half an oscillation, or the time required for two oscillations, etc. The user may manually enter the period of oscillation into the IO device 120, 320, which then transmits the period of oscillation to the electronic module 128, 328 and is subsequently stored on the memory 136. The period of oscillation may also be measured by a sensor 144 (or multiple sensors) and transmitted directly to the electronic module 128, 328 from the at least one sensor 144. In other examples, the sensor 144 can transmit the period of oscillation to the IO device 120, 320, which transmits the period of oscillation to the electronic module 128, 328. The sensor 144 may also display the period of oscillation on the user interface which is read by the user and entered into the IO device 120, 320 by the user, which transmits the period of oscillation to the electronic module 128, 328. The period of oscillation may also be retrieved from the remote database. In such an example, the (wired or wireless) communication module communicatively couples the electronic module 128, 328 to the remote database after which the user may select the particular period of oscillation stored on the remote database by selecting via the IO device 120, 320 a unique designation stored in the remote database that corresponds to the period of oscillation for the object 104, 304.

The memory 136 may also store a moment of inertia of the object 104, 304 or the rotating parts of the system. In particular, the moment of inertia may be measured, calculated, or otherwise determined by the user either prior to attaching the object 104 to the securement mechanism 132, 332 or after the object 104, 304 is suspended from the securement mechanism 132, 332. In either case, the user may manually enter the moment of inertia, or any function of the moment of inertia, into the IO device 120, 320, which then transmits the moment of inertia to the electronic module 128, 328 and is subsequently stored on the memory 136. The moment of inertia may also be measured by at a sensor 144 (or multiple sensors) and transmitted directly to the electronic module 128, 328 from the sensor 144. In other examples, the sensor 144 can transmit the moment of inertia to the IO device 120, 320, which transmits the moment of inertia to the electronic module 128, 328. The sensor 144 may also display the moment of inertia on the user interface which is read by the user and entered into the IO device 120, 320 by the user, which then transmits the moment of inertia to the electronic module 128, 328. The moment of inertia may also be retrieved from the remote database. In such an example, the (wired or wireless) communication module communicatively couples the electronic module 128, 328 to the remote database after which the user may select the particular moment of inertia stored on the remote database by selecting via the IO device 120, 320 a unique designation stored in the remote database that corresponds to the moment of inertia for the object 104, 300 or the system 100, 300.

The IO device 120, 320 can receive at least one input from the operator. The 10 device 120, 320 is also capable of receiving and interpreting multifunctional inputs (e.g., multiple interactions with the same input) in addition to singular inputs (e.g., a single interaction with an input). The device can be programmed so that pressing the first button of the pendant in different ways transmits different command signals and causes different operations. For example, the device can be programmed so that pressing and holding the first button causes the IO device 120, 320 to continuously transmit the first command signal to the electronic module 128, 328, in response to which the electronic module 128, 328 causes the rotational motor 135, 335 to rotate the object 104, 304 in the horizontal plane for a duration substantially equal to the duration that the first button was pressed. Consecutively pressing the same button a predetermined number of times (e.g., two times, three times, four times, or one short press and one long press) transmits a second command signal to the electronic module 128, 328 from the IO device 120, 320, in response to which the electronic module 128, 328 causes the motor to rotate the object 104, 304 in a different manner, such as rotating the object 104, 304 to a predetermined angular position.

The IO device 120, 320 is also capable of receiving multifunction inputs from the user that cause the overhead crane 106, 306 to rotate the object 104, 304 at various angular velocities. In particular, consecutively pressing a second button a predetermined number of times (e.g., two times, three times, four times, or one short press and one long press) can transmit a third command signal to the electronic module 128, 328 from the IO device 120, 320. The third command signal, when executed by the electronic module 128, 328, can cause the electronic module 128, 328 to operate the rotational motor 135, 335 in a manner that rotates the object 104, 304 at a predetermined angular velocity. Additionally, the IO device 120, 320 can receive multifunctional inputs from the user that cause the overhead crane 106, 306 to rotate the object 104, 304 by predetermined angular displacements. In particular, consecutively pressing a third button a predetermined number of times (e.g., two times, three times, four times, or one short press and one long press) can transmit a fourth command signal to the electronic module 128, 328 from the IO device 120, 320. The fourth command signal, when executed by the electronic module 128, 328, can cause the electronic module 128, 328 to operate the rotational motor 135, 335 such that the object 104, 304 is rotated by a predetermined angular displacement. Repetitively pressing the third button the predetermined number of times can "stack" the predetermined angular displacement. In other words, the object 104, 304 can be rotated by the predetermined angular displacement (e.g., 15 degrees) multiplied by the amount of times the third button was pressed the predetermined number of times.

Depending on the type of IO device 120, 320 used in the system, the IO device 120, 320 may not require the user to enter multifunctional inputs. The device could be programmed to enable the user to manually enter the exact desired angular position of the object 104, 304. Such IO devices 120, 320 could also advantageously enable other variables and parameters of the object 104, 304 and system 100, 300 to be entered and used in dampening the torsional oscillation of the object 104, 304. Also, using an IO device 120, 320 that includes a user interface allows the IO device 120, 320 to display information about the rotation of the object 104, 304. For example, after the user interacts with the IO device 120, 320 in any of the manners discussed above, the IO device 120, 320 can display the final angular position of the object 104, 304 and/or the total angular displacement of the object 104, 304 based on the inputs received from the user. The IO device 120, 320 may display the displacement and position information in real time, so that the user can precisely move the overhead crane 106, 306 and the object 104, 304. This may mitigate, or entirely eliminate, the need for the user to rely on his or her memory in determining displacement and position.

Once the necessary mass-dependent value is stored in the memory 136 of the electronic module 128, 328 or accessible in the remote database, the processor 140 calculates (or otherwise determines) the torsional oscillation dampening signal using an algorithm that is based in part on that mass-dependent value. In response to a triggering event (e.g., receiving a command signal from the IO device 120, 320), the processor 140 can be arranged to reference the memory 136 for the particular mass-dependent value that is necessary to calculate a torsional oscillation dampening signal. To perform that calculation, additional information, such as the length of the rope, an algorithm of that length, or an estimated common value can be factored into the algorithm.

The mass-dependent value need not be stored on the memory 136. Instead, the processor 140 can be configured to receive the mass-dependent values from the IO device 120, 320 when the IO device 120, 320 transmits the command signal to the electronic module 128, 328. In particular, the user can manually enter the mass-dependent value into the IO device 120, 320, which then transmits the mass-dependent value to the electronic module 128, 328. The IO device 120, 320 can then transmit the mass-dependent values to the electronic module 128, 328 along with the command signal providing the position commands and/or the speed commands. Alternatively, or in addition to that, the IO device 120, 320 can be arranged to provide the mass-dependent values to the electronic module 128, 328 independent of the transmission of the command signal. In that case, the IO device 120, 320 can transmit the mass-dependent value to the electronic module 128, 328 when the user manually inputs the mass-dependent value into the IO device 120, 320.

As discussed above, in response to receiving at an input, the IO device 120, 320 can transmit the command signal to the electronic module 128, 328. As illustrated in FIGS. 3 and 4, the command signal can be in the form of position commands or speed commands, respectively. In particular, the user can interact with the IO device 120, 320 in a variety of ways and each input received by the IO device 120, 320 corresponds to a different command signal, which is transmitted to the electronic module 128, 328 and received by the processor 140. The processor 140 interprets and analyzes each command signal transmitted to the electronic module 128, 328 from the IO device 120, 320 and determines how to use the information received in the command signal.

For example, the command signal received by the electronic module 128, 328 from the IO device 120, 320 can include a position command as illustrated in FIG. 3, which can include information indicative of a predetermined angular position or a predetermined angular displacement. Based on which particular positional information is included in a position command signal, the processor 140 calculates the torsional oscillation dampening signal using the algorithm that is based in part on the information provided in the position command signal as well as the mass-dependent value(s) particular to the suspended object or the rotating parts of the system. The position command signal that is received by the electronic module 128, 328 could typically include an end result. In other words, the position command signal could provide the electronic module 128, 328 with, for example, a final angular position or a final angular displacement. The processor 140 could then use the information provided in the position command signal as well as mass-dependent value particular to the object 104, 304 being rotated to determine the torsional oscillation dampening signal. In turn, the processor 140 could then execute the drive logic using the calculated torsional oscillation dampening signal to operate the rotational motor 135, 335 so that the object 104, 304 reaches the final angular position, or moves by the predetermined angular displacement, while substantially mitigating, or effectively eliminating, torsional oscillation experienced by the object 104, 304 as the object rotates.

The processor 140 can be arranged to undergo a substantially similar process when the electronic module 128, 328 receives a command signal that includes a speed command rather than a position command. For example, the speed commands received by the electronic module 128, 328 from the IO device 120, 320 can include a speed command, as illustrated in FIG. 4, which can include information indicative of a predetermined angular velocity or predetermined angular acceleration. Based on the particular speed information included in a speed command signal, the processor 140 can calculate the torsional oscillation dampening signal using the algorithm that is based at least in part on the information provided in the speed command signal as well as the mass-dependent value(s) particular to the object 104, 304 suspended, or the system 100, 300. The speed command signal received by the electronic module 128, 328 could again typically include an end result. In other words, the speed command signal could provide the electronic module 128, 328 with, for example, a final angular velocity or a final angular acceleration. The processor 140 could then uses the information provided in the position command signal as well as mass-dependent value particular to the object 104, 304 being rotated to determine the torsional oscillation dampening signal. In turn, the processor 140 could then executes the motor control using the calculated torsional oscillation dampening signal to operate the rotating motor 135, 335 so that the object 104, 304 reaches the predetermined angular velocity, or the angular acceleration, while mitigating, or effectively eliminating, torsional oscillation experienced by the object 104, 304 as the object is rotated. While the processor 140 has been discussed as calculating the torsional oscillation dampening signal in response to receiving the command signal from the IO device 120, 320, calculations may be made remotely and then transmitted back to the electronic module. For example, the electronic module can transmit the information necessary to calculate the torsional oscillation dampening signal to a remote database or the cloud. Once received, the remote database, or the cloud, calculates the torsional oscillation dampening signal and transmits the calculated torsional oscillation dampening signal back to the electronic module 128.

Figure 5:
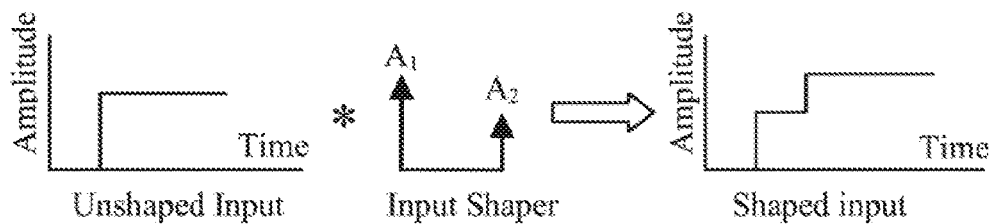
FIG. 5 is a diagram illustrating input shaping.
Figure 6:
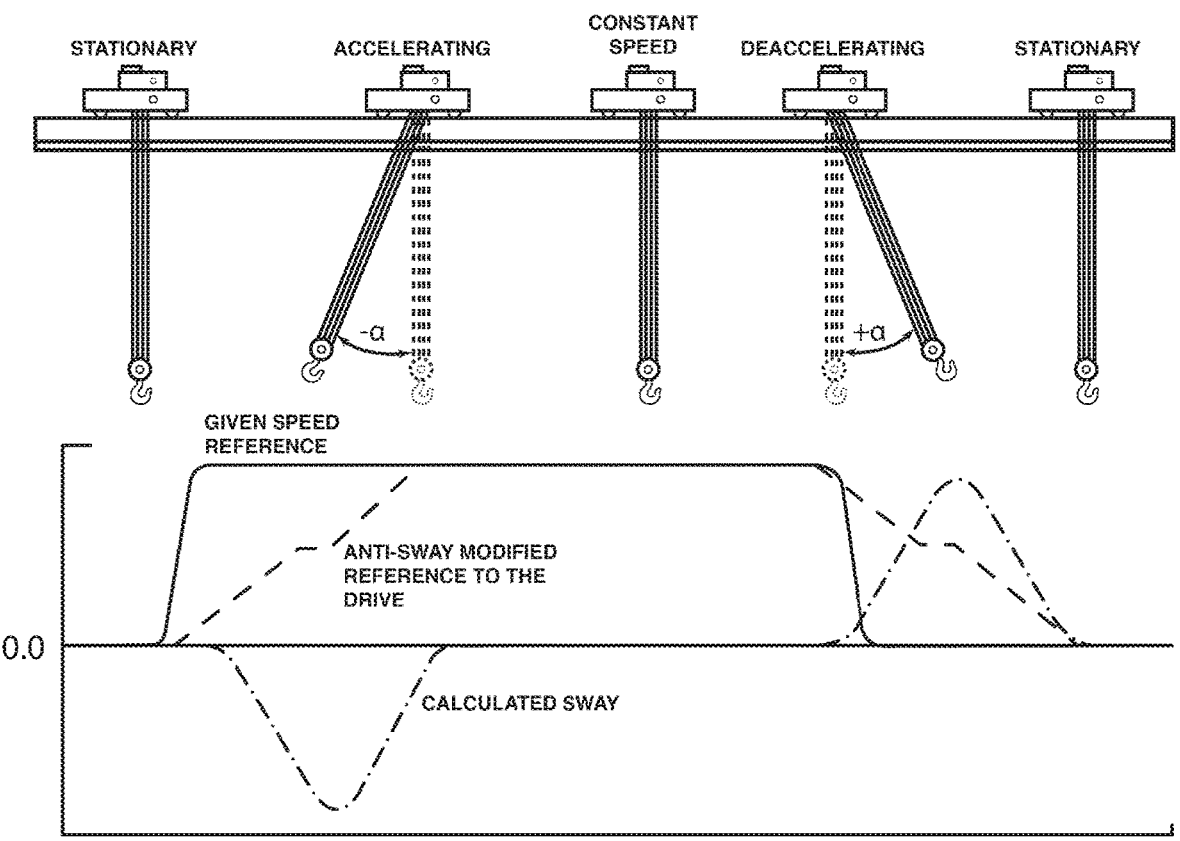
FIG. 6 is another diagram illustrating input shaping.

FIGS. 5 and 6 show an example of converting the command signals into a torsional oscillation dampening signal using a method called input shaping. Input shaping is a technique used to control acceleration. The motor control (e.g., motor control 238) reads the speed reference signal from the IO device 120, 320 and provides the necessary combination of voltage and current to accelerate the motor up to the reference speed. In other settings, a motor is typically accelerated to a desired speed using a constant acceleration curve. The input shaping technique applies a varying acceleration profile rather than a constant one. This typically involved a stepwise approach to the acceleration. In particular, the controller accelerates the motor for a period, stops accelerating, pauses for a period, then continues to accelerate up to full speed. The quantity of acceleration ramps, the rate of the ramps, and the duration of each is dependent on the dynamics of the system. The particular type of input shaping illustrated here is commonly known as "bang-bang control". This type of control method is one of many that can be used with the disclosed electronic module. Input shaping, filters, or other techniques known to those skilled in the art utilize the mass dependent value described herein to properly calculate the required torsional oscillation signals. This differs from the current methods of dampening the pendulum motion of a crane load in that those systems do not use a mass dependent value to calculate the proper dampening signals. An example of how the command signal can be converted into a torsional oscillation dampening signal can be found in U.S. Pat. No. 6,050,429, entitled "Method for Inching a Crane without Load Swing" which issued on Apr. 18, 2000 and the contents of which are incorporated by reference.

Figure 7:
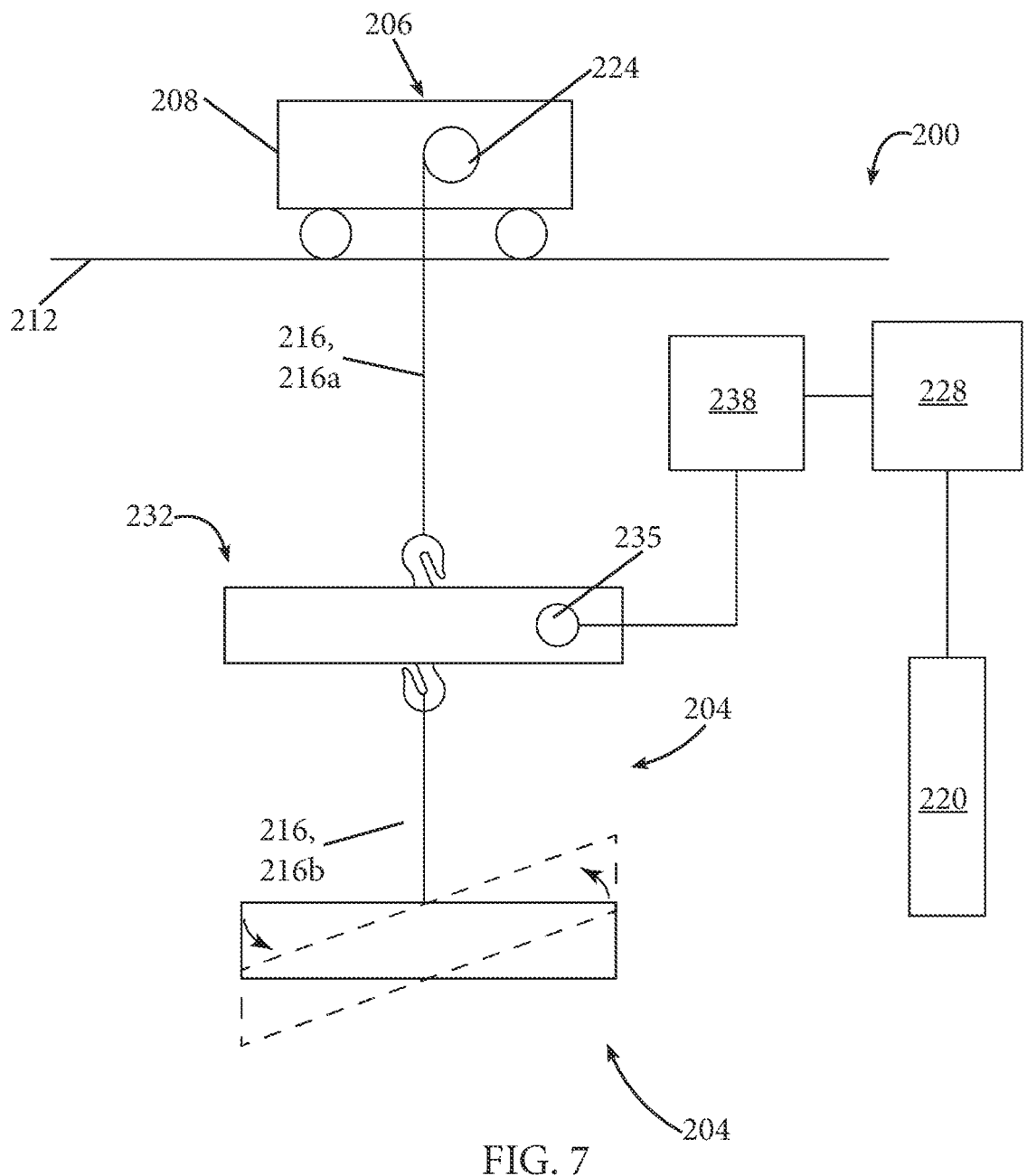
FIG. 7 is another block diagram of a system for dampening torsional oscillation of an object that rotates in the horizontal plane.
Figure 8:
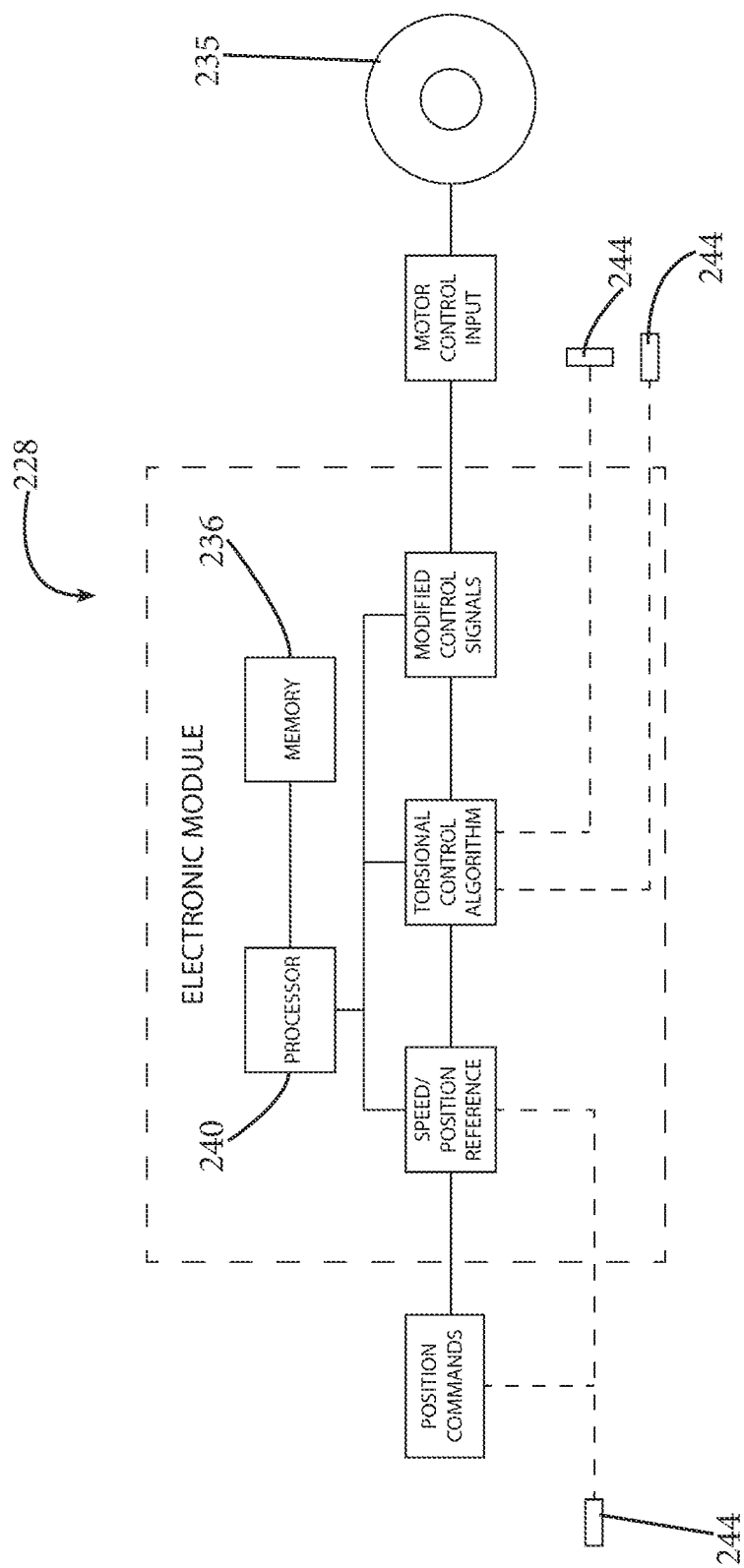
FIG. 8 is a block diagram of the electronic module of FIG. 5 receiving a positional command.
Figure 9:
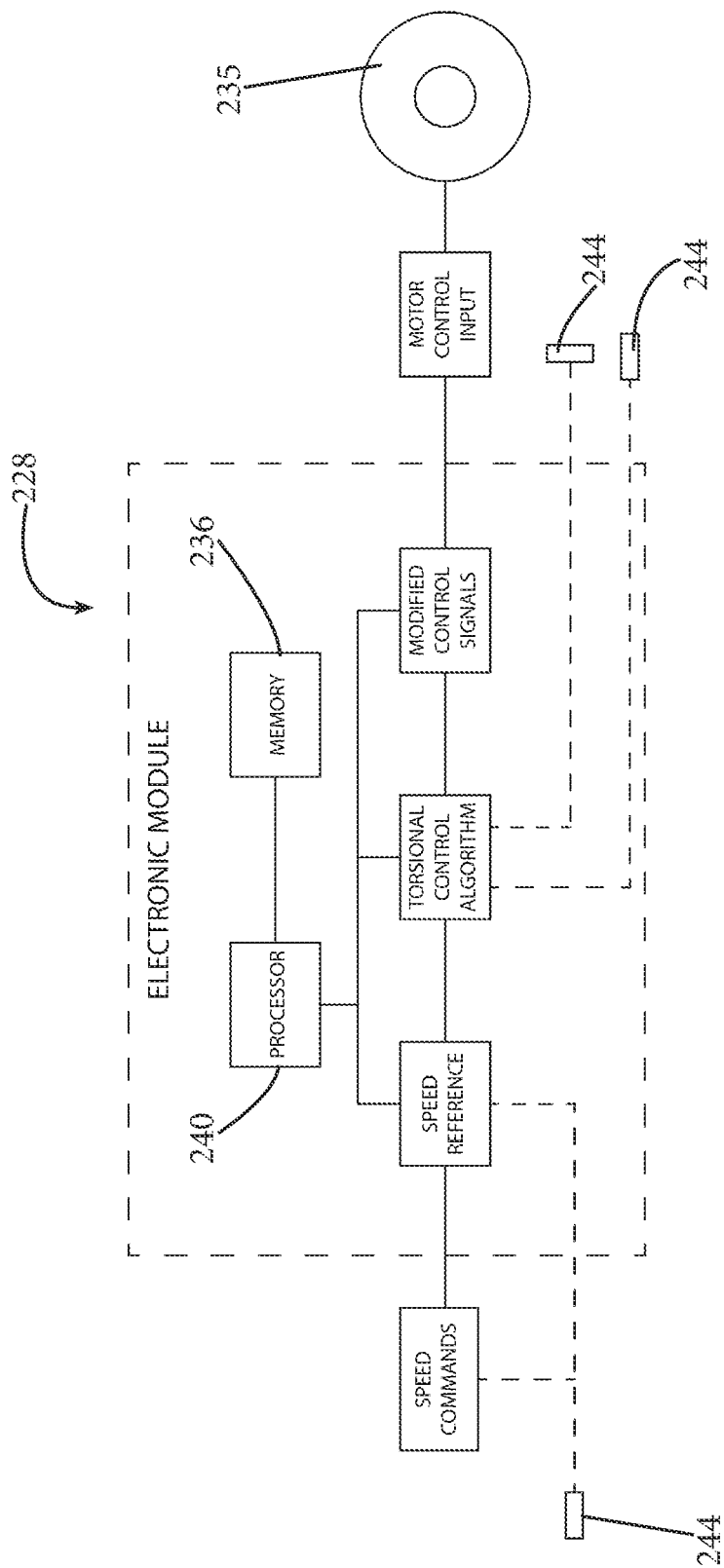
FIG. 9 is a block diagram of the electronic module of FIG. 5 receiving a speed command.

FIGS. 7-9 illustrate a third example system 200. The system 200 of FIGS. 7-9 is similar to the system 100 of FIG. 1 and the system 300 of FIG. 2, except the system 200 modifies command signals received from the IO device 220 using an algorithm based at least in part on a mass-dependent value of the suspended object 204 or the rotatable parts within the system (i.e., from rope 216a down) to create a set of modified control commands that are sent to and executed by a motor control 238. When the motor control 238 executes the modified control commands, the motor control 238 operates the rotational motor 235 in a manner that mitigates, or effectively eliminates, torsional oscillation experienced by the suspended object when rotated in the horizontal plane. Thus, for ease of reference, and to the extent possible, the same or similar components of the system 100 will retain the same reference numbers, although the reference numbers will be increased by 100.

Similar to the system 100 of FIG. 1 and the system 300 of FIG. 2, the system 200 of FIGS. 7-9 includes the overhead crane 206 that is disposed on and travels along the track 212, the securement mechanism 232 that is suspended from the hoist motor 224 of the trolley 208, and the suspended object 204. It also includes the IO device 220 that receives an input from an operator and transmit a command signal to the electronic module 228 in response to that input. Here, however, the electronic module 228 is retrofitted to an existing motor control 238. So configured, the electronic module 228 receives the command signal from the IO device 220, modifies the received command signal to mitigate, or effectively eliminate, torsional oscillation experienced by the object 204 rotating, or of the parts of the system rotating, and transmits the modified command signal to the motor control 238. Accordingly, the motor control 238 and the electronic module 228 are distinct components that are communicatively coupled to one another.

The system 200 illustrated in FIGS. 7-9 includes many of the same or similar components as the system 100 illustrated in FIG. 1 and the system 300 illustrated in FIG. 2. The system 200, however, includes a modified configuration and integration of the electronic module 228. In particular, rather than being directly coupled to the overhead crane 208, the electronic module 228 is disposed remotely from the overhead crane 208 and interfaces with the motor control 238, which ultimately controls the rotation of the object 204. In this case, "remotely" is not limited to mean that the electronic module 228 is located in a different facility or an entirely different area of the facility housing the overhead crane 208. Rather, "remotely" also encompasses being disposed proximate the overhead crane 208 but not directly coupled to the overhead crane 208. That being said, in some examples, the electronic module 228 of the system 200 can be disposed on, or otherwise mechanically coupled to, the overhead crane 208.

The electronic module 228 of the system 200 of FIGS. 7-9 is communicatively coupled to both the IO device 220 and the motor control 238, which is ultimately communicatively coupled to the rotational motor 235. So configured, the electronic module 228 receives information and command signals transmitted from the IO device 220 before the information reaches the overhead crane 208. Additionally, the electronic module 228 includes a memory 236, a processor 240 that stores information on and retrieves information from the memory 236 and is communicatively coupled to at least one sensor 244. The motor control 238 can be a conventional motor control that is communicatively coupled to the rotational motor 235 and operates the rotational motor 235 based on the received modified command signals. In some settings, the motor control 238 could be incorporated into the rotational motor 235 itself. In the disclosed system, there are no special requirements for the motor control 238 that would not be understood by those of ordinary skill in the art. Accordingly, any conventional motor control 238 that accepts command signals can be used. As used throughout the disclosure, the term "motor control" means contactors, switches, relays, drives, motor controllers, or any control mechanism that can operate the motor.

Where the electronic module 228 of the system 200 differs from the electronic module 128 of the system 100 is in how the electronic module 228 of the system 200 is configured to substantially mitigate, or completely eliminate, torsional oscillation experienced by the object 204 during rotation. In particular, the IO device 220 receives at least one input from the operator, which the IO device 220 transmits to the electronic module 228 as a command signal. Each input received by the IO device 220 corresponds to a unique command signal that, when received by the electronic module 228, begins a series of modifications to the received command signal. As illustrated in FIG. 8, the IO device 220 transmits a position command signal that may include information indicative of a predetermined angular position or a predetermined angular displacement. Once the electronic module 228 receives the position command signal from the IO device 220, the electronic module 228 then modifies the received position command signal. In particular, the electronic module 228 modifies the received position command signal in various ways depending on the information included in the received position command signal. If, for example, the position command signal received by the electronic module 228 includes information indicating a predetermined angular position to which the object 204 is to be rotated, then the electronic module 228 modifies the received position command signal such that when a modified control signal, sent by the electronic module 228 to the motor control 238, is executed by the secondary electronic module 238, the torsional oscillation traditionally experienced by the object 204 is mitigated, or effectively eliminated.

In such an example, the processor 240 of the electronic module 228, much like the processor 140 of the electronic module 128, calculates the torsional oscillation dampening signal using an algorithm that is based in part on the information provided in the received position command signal as well as the mass-dependent value associated with the suspended object 204. The received position command signal could typically include an end result. In other words, the position command signal could provide the electronic module 228 with the final angular position to which the object 204 is to be rotated. The processor 240 then uses the information provided in the received position command signal and the mass-dependent value particular to the object 204 being rotated (or to the rotatable parts of the system) to determine the torsional oscillation dampening signal using an algorithm based on that value. Once the processor 240 of the electronic module 228 calculates the torsional oscillation dampening signal, the processor 240 modifies the received command signal using the calculated torsional oscillation dampening signal to create a set of modified control signals. The electronic module 228 then transmits the set of modified control signals to the motor control 238, which controls the rotational motor 235 disposed within the securement mechanism 232. The motor control 238 operates the rotational motor 235 using the modified control signals so that the object 204 rotates to the predetermined angular position initially sent from the IO device 220 while experiencing little or no oscillation after reaching the final angular position.

The IO device 220 illustrated in n FIG. 9 transmits a speed command signal that can include information that indicates a predetermined angular velocity or a predetermined angular acceleration. Once the electronic module 228 receives the speed command signal from the IO device 220, the electronic module 228 then modifies the received speed command signal in various ways depending on the information included in the received spend command signal. If, for example, the speed command signal received by the electronic module 228 includes information indicating a predetermined angular velocity at which that the object 204 is to be rotated, then the electronic module 228 modifies the received speed command signal such that when a modified control signal is executed by the motor control 238, the torsional oscillation traditionally experienced by the object 204 is mitigated, or effectively eliminated, after reaching the final angular position.

Much like the processor 140 of the electronic module 128, the processor 240 of the electronic module 228 calculates the torsional oscillation dampening signal using an algorithm that is based in part on the information provided in the received speed command signal as well as the mass-dependent value associated with the suspended object 204. The received speed command signal could typically include an end result. In other words, the speed command signal could provide the electronic module 228 with the final angular velocity, or final angular acceleration, at which the object 204 is to be rotated. The processor 240 then uses the information provided in the received speed command signal and the mass-dependent value particular to the object 204 being rotated (or to the rotatable parts of the system) to calculate the torsional oscillation dampening signal. Once the processor 240 of the electronic module 228 calculates the torsional oscillation dampening signal, the processor 240 then modifies the received speed command signal using the calculated torsional oscillation dampening signal to create a set of modified control signals. The electronic module 228 then transmits the set of modified control signals to the motor control 238, which controls the rotational motor 235. The motor control 238 operates the rotational motor 235 using the modified control signals so that the object 204 rotates at the predetermined angular velocity, or predetermined angular acceleration, initially sent from the IO device 220, such that the object 204 rotates at the final angular velocity, or final angular acceleration, while mitigating, or effectively eliminating, subsequent torsional oscillation of the object 204 after it is rotated.

Figure 10:
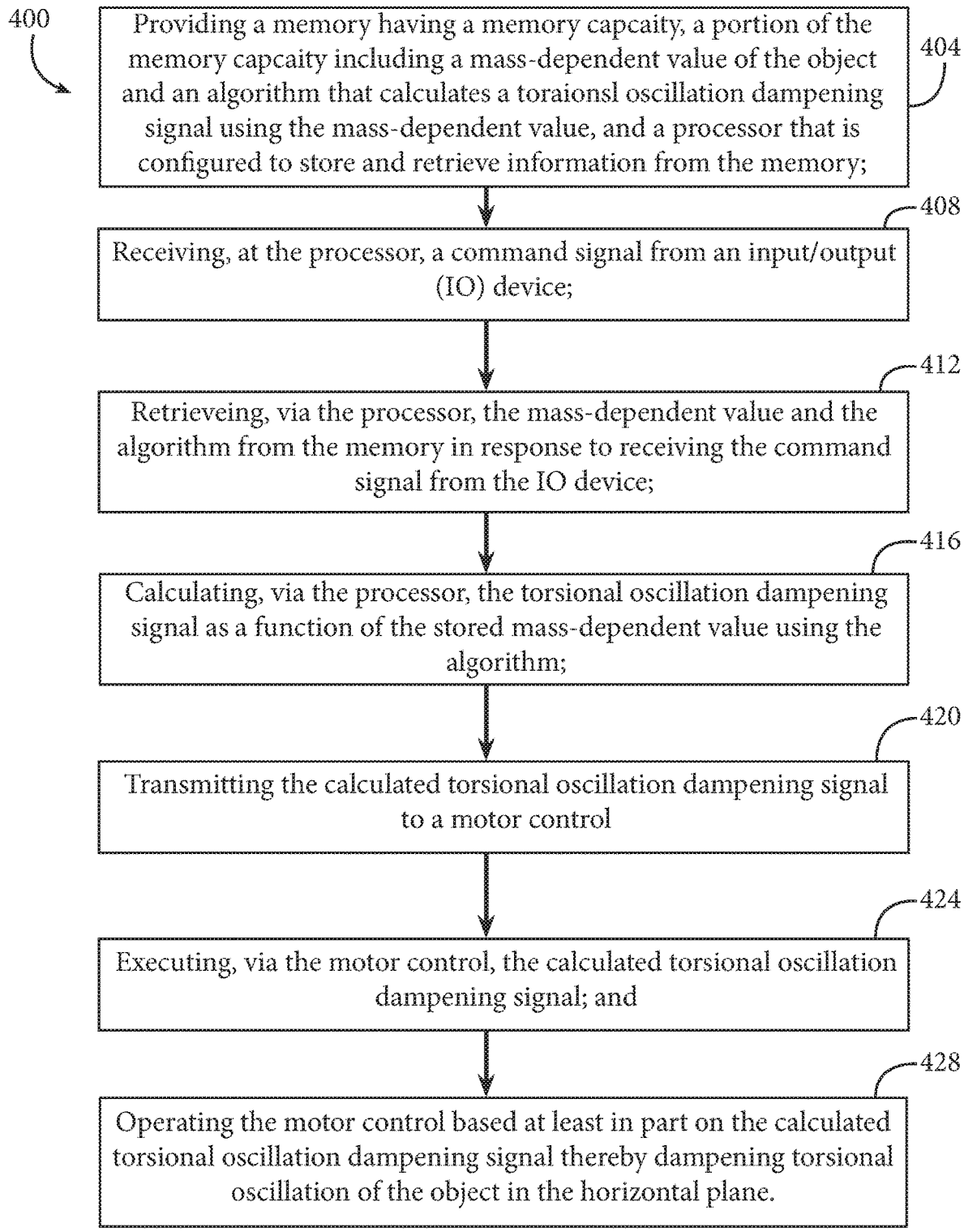
FIG. 10 is a flow chart illustrating a method of dampening torsional oscillation.

FIG. 10 illustrates a method 400 in which torsional oscillation of a suspended object that rotates in a horizontal plane is dampened in a system that includes a motor control. The method 400 includes providing (step 404) a memory having a memory capacity where a portion of the memory capacity includes a mass-dependent value of the object and an algorithm that calculates a torsional oscillation dampening signal using the mass-dependent value, and a processor that is configured to store information on the memory and retrieve information from the memory. The method 400 includes receiving (step 408), at the processor, a command signal from an input/output (IO) device. The mass-dependent value of the object is retrieved from the memory, via the processor, in response to receiving the command signal from the IO device (step 412). The processor then calculates (step 416) a torsional oscillation dampening signal as a function that is based at least in part on the stored mass-dependent value using the algorithm. Once the processor calculates the torsional oscillation dampening signal, the calculated torsional oscillation dampening signal is transmitted (step 420) to a motor control. The motor control is then operated (step 324) based at least in part on the calculated torsional oscillation dampening signal which dampens the torsional oscillation experienced by an object rotating in the horizontal plane.

While the systems and methods discussed throughout the disclosure include an overhead crane 106, 206, 306, it is to be understood that, in some examples, an overhead crane is not necessary. Instead, the electronic module can be communicatively coupled to a securement mechanism that is not part of, or attached to, a crane. For example, a rope can be securely coupled to a support structure and releasably coupled to the securement mechanism. So configured, the electronic module can dampen torsional oscillation of an object suspended from the rope despite the rope not being operatively coupled to a hoist motor of an overhead crane.

Those skilled in the art will recognize that a wide variety of modifications, alterations, and combinations can be made with respect to the above described examples without departing from the scope of the disclosure, and that such modifications, alterations, and combinations are to be viewed as being within the ambit of the inventive concept.

We claim:

1. An electronic module that dampens torsional oscillation of an object that rotates in a horizontal plane in a system that includes a motor control, the electronic module comprising:

a memory that is configured to store a mass dependent value of the object or of rotating parts of the system;
a housing; and
a processor that is positioned within the housing, the processor being configured to:
receive the mass-dependent value of the object,
store the mass-dependent value of the object in the memory,
calculate a torsional oscillation dampening signal using an algorithm that is based at least in part on the mass-dependent value of the object or of the rotating parts of the system, and
transmit the torsional oscillation dampening signal to the motor control thereby dampening torsional oscillation of the object rotating in the horizontal plane.

2. The electronic module of claim 1, wherein the mass-dependent value is a measured weight of the object or of the rotating parts of the system.

3. The electronic module of claim 1, wherein the mass-dependent value is a measured period of oscillation of the object in the horizontal plane without dampening.

4. The electronic module of claim 1, wherein the mass-dependent value is a referenced moment of inertia of the object or of the rotating parts of the system.

5. The electronic module of claim 1, wherein the electronic module is configured for use with objects that are suspended by a rope, a chain, a cable, or a wire.

6. The electronic module of claim 1, wherein at least one predetermined angular preference is stored in the memory, the predetermined angular preference comprising (a) a predetermined angular displacement or (b) a predetermined angular position; and
the processor is configured to receive the at least one predetermined angular preference and is configured to calculate the torsional oscillation dampening signal using the received predetermined angular preference.

7. The electronic module of claim 1, wherein the memory is disposed in the housing.

8. The electronic module of claim 1, wherein the processor is configured to receive at least one command signal from an input/output (IO) device.

9. The electronic module of claim 8, wherein at least one predetermined angular position is stored in the memory, the predetermined angular position comprising (a) a predetermined angular displacement or (b) a predetermined angular position; and
the processor is configured to determine the torsional oscillation dampening signal using the predetermined angular preference and the at least one command signal.

10. The electronic module of claim 8, wherein the command signal comprises at least one predetermined angular preference that comprises (a) a predetermined angular displacement or (b) a predetermined angular position; and
the processor is configured to determine the torsional oscillation dampening signal using the at least one command signal.

11. The electronic module of claim 8, wherein at least one predetermined angular velocity is stored on the memory, and
the processor is configured to determine the torsional oscillation dampening signal using the predetermined angular velocity and the at least one command signal.

12. The electronic module of claim 8, wherein the command signal comprises at least one predetermined angular velocity, and the processor is configured to determine the torsional oscillation dampening signal using the at least one command signal.

13. The electronic module of claim 1, wherein the processor is configured to receive a sensor signal from a sensor, and the processor is configured to determine the torsional oscillation dampening signal using the sensor signal.

14. A system that dampens torsional oscillation of an object that rotates in a horizontal plane, the system comprising:

a motor that is configured to rotate the object in the horizontal plane;

a motor control that is operably coupled to the motor and is configured to control the motor based on at least one input; and an electronic module that is communicatively coupled to the motor control, the electronic module comprises:
a housing;
a memory that is disposed within the housing and is configured to store a mass-dependent value of the object or of rotating parts of the system rotating in the horizontal plane; and
a processor that is disposed within the housing, the processor being configured to:
receive the mass-dependent value of the object or of the rotating parts of the system,
store the mass-dependent value of the object or of the rotating parts of the system in the memory,
calculate a torsional oscillation dampening signal using an algorithm that is based at least in part on the received mass-dependent value of the object or of the rotating parts of the system, and
transmit the torsional oscillation dampening signal to the motor control causing the motor control to operate the motor based on the torsional oscillation dampening signal thereby dampening torsional oscillation of the object rotating in the horizontal plane.

15. The system of claim 14, wherein the mass-dependent value is the weight of the object or the weight of the rotating parts of the system.

16. The system of claim 14, wherein the mass-dependent value is the period of oscillation of the object when rotating in the horizontal plane without dampening.

17. The system of claim 14, wherein the mass-dependent value is a measured or referenced moment of inertia of the object or of the rotating parts of the system.

18. The system of claim 14, wherein the electronic module is configured for use with objects that are suspended by a rope, a chain, a cable, or a wire.

19. The system of claim 14, wherein at least one predetermined angular preference is stored in the memory, the at least one predetermined angular preference comprising (a) a predetermined angular displacement or (b) a predetermined angular position; and the processor is configured to receive the at least one predetermined angular preference and to calculate the torsional oscillation dampening signal using the received predetermined angular preference.

20. The system of claim 14, wherein at least one predetermined angular velocity is stored in the memory, and the processor is configured to receive the at least one predetermined angular velocity and to calculate the torsional oscillation dampening signal using the received predetermined angular velocity.

21. The system of claim 14, further comprising an input/output (IO) device communicatively coupled to the electronic module, the IO device configured to receive at least one command input from a user and transmit a command signal to the electronic module in response to receiving the at least one command input.

22. The system of claim 21, wherein at least one predetermined angular preference is stored on the memory, the at least one predetermined angular preference comprising (a) a predetermined angular displacement or (b) a predetermined angular position; and the processor is configured to determine the torsional oscillation dampening signal based in part on the at least one predetermined angular preference and the at least one command signal.

23. The system of claim 21, wherein at least one predetermined angular velocity is stored on the memory, and the processor is configured to determine the torsional oscillation dampening signal based in part on the at least one predetermined angular velocity and the at least one command signal.

24. The system of claim 18, wherein the processor is configured to calculate the torsional oscillation dampening algorithm based further in part on a length of the rope, the chain, the cable, or the wire.

25. The system of claim 18, further comprising a securement mechanism including a first attachment mechanism and a second attachment mechanism, the first attachment mechanism configured to couple the securement mechanism to the rope, the chain, the cable, or the wire, and the second attachment mechanism is configured to couple the object to the rope, the chain, the cable, or the wire, wherein, the motor control operates a rotational motor operably coupled to the second attachment mechanism of the securement mechanism such that the object rotates in the horizontal plane.

26. The system of claim 14, further comprising an input/output (IO) device communicatively coupled to the electronic module, the IO device including a plurality of buttons configured to transmit a command signal to the electronic module in response to a user interacting with the plurality of buttons, wherein a first button of the plurality of buttons is configured to transmit a first command signal to the electronic module each time the first button is pressed, the first command signal comprising a first angular displacement; and wherein the processor of the electronic module is configured to calculate a first total angular displacement based on the number of first command signals received from the IO device and to determine the torsional oscillation dampening signal based on the calculated first total angular displacement.

27. The system of claim 26, wherein a second button of the plurality of buttons is configured to transmit a second command signal to the electronic module each time the second button is pressed, the second command signal comprising a second angular displacement, the second angular displacement being an additive inverse of the first angular displacement; and wherein the processor of the electronic module is configured to calculate a second total angular displacement based on a number of first command signals received from the IO device and a number of the second command signals received from the IO device, and to determine the torsional oscillation dampening signal based on the calculated second total angular displacement.

28. The system of claim 26, wherein the IO device further comprises a switch movable between a first position and a second position,
wherein, when the switch is in the first position, the first command signal comprises a first angular displacement, and when the switch is in the second position, the first command signal comprises a second angular displacement, the first angular displacement being different than the second angular displacement.

29. The system of claim 21, wherein the IO device includes a potentiometer configured to receive the at least one command input, the at least one command input indicative of a predetermined angular position, and the command signal being indicative of the predetermined angular position; and
wherein the processor is configured to determine the torsional oscillation dampening signal based in part on the received command signal.

30. A system that dampens torsional oscillation of an object that rotates in a horizontal plane, the system comprising:
a securement mechanism that is configured to suspend the object in the horizontal plane;
a motor that is operably coupled to the securement mechanism such that, when the motor acts on the securement mechanism, the object rotates in the horizontal plane; and
an electronic module that is communicatively coupled to the motor control and comprises:
a motor control that is operably coupled to the motor and is configured to operate the motor based on at least one input
a memory that is disposed within the housing and is configured to store a mass-dependent value of the object; and
a processor that is disposed within the housing and is configured to:
receive the mass-dependent value of the object and store the mass-dependent value of the object in the memory,
calculate a torsional oscillation dampening signal using an algorithm that is based at least in part on the mass-dependent value of the object, and
transmit the torsional oscillation dampening signal to the motor control;
wherein, when the motor control executes the torsional oscillation dampening signal, the motor control dampens torsional oscillation of the object rotating in the horizontal plane.

31. The system of claim 30, wherein the electronic module further comprises a house, the motor control, the memory, and the processor being disposed within the electronic module.

32. A method for dampening torsional oscillation of a suspended object that rotates in a horizontal plane in a system that includes a motor control, the method comprising:
providing a memory having a memory capacity, a portion of the memory capacity including a mass-dependent value of the object or of rotating parts of the system and an algorithm that calculates a torsional oscillation dampening signal using the mass-dependent value, and a processor that is configured to store and retrieve the mass-dependent value and the algorithm from the memory;
receiving, at the processor, a command signal from an input/output (IO) device;
retrieving, via the processor, the mass-dependent value and the algorithm from the memory in response to receiving the command signal from the IO device;
calculating, via the processor, the torsional oscillation dampening signal as a function of the stored mass-dependent value using the algorithm;
transmitting the calculated torsional oscillation dampening signal to the motor control; and
operating the motor, via the motor control, based at least in part on the calculated torsional oscillation dampening signal thereby dampening torsional oscillation of the object in the horizontal plane.

33. The method of claim 32, in which the mass-dependent value is a value that is intrinsic to the object or to the parts of the system that rotate and not dependent upon the state of motion of the object or the parts of the system that rotate.

34. The method of claim 32, in which the mass-dependent value is a value that is dependent upon the state of motion of the object or the parts of the system that rotate.

35. The method of claim 32, in which the mass-dependent value of the rotating object or of the parts of the system that rotate is stored in memory and retrieved by the processor before the desired rotational movement of the object begins.

\* \* \* \* \*